N. Johnson,
Water Wheel,

No. 474.   Patented Nov. 23, 1837.

UNITED STATES PATENT OFFICE.

NELSON JOHNSON, OF ERWIN CENTRE, NEW YORK.

IMPROVEMENT IN REACTION WATER-WHEELS.

Specification forming part of Letters Patent No. 474, dated November 23, 1837.

*To all whom it may concern:*

Be it known that I, NELSON JOHNSON, of Erwin Centre, in the county of Steuben and State of New York, have invented a new and useful Improvement in Reacting Water-Wheels for Propelling Mills, called "Johnson's Bevel-Curve Vent Reaction Water-Wheels," which is described as follows, reference being had to the annexed drawings of the same, making part of this specification.

Figure 1:
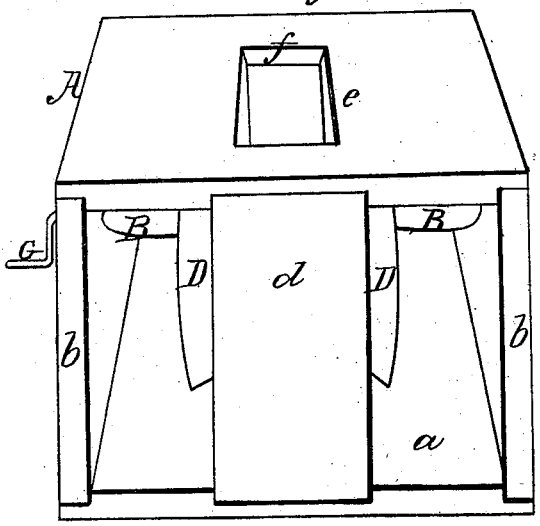
Figure 2:
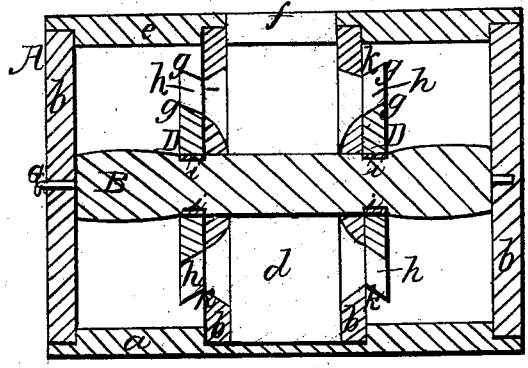
Figure 3:
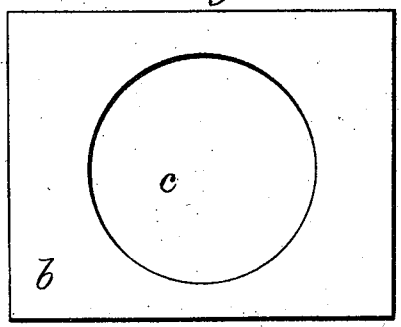
Figure 4:
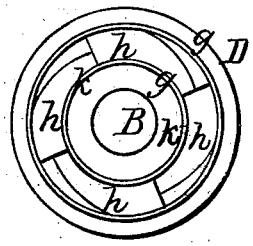
Figure 5:
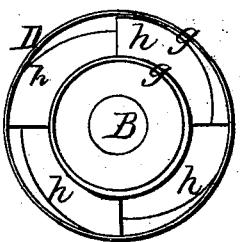
Figure 7:
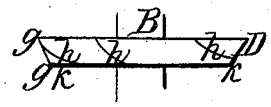
Figure 6:
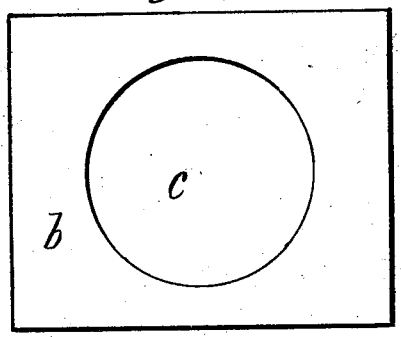

The wheel-case A, Figures 1 and 2, is composed of a horizontal piece of timber $a$ of sufficient length, breadth, and thickness, upon which are erected four parallel vertical pieces $b\ b\ b\ b$ of timber, the two center ones having each a circular aperture in the center $c\ c$, Figs. 3 and 6, of the requisite diameter to receive the water-wheel hereinafter described. The space between the two center pieces is closed at the sides by two other vertical pieces $d\ d$, Figs. 1 and 2, which makes this part of the case water-tight, except the top for the admission of the water and the two circular apertures through which it is discharged. On the top of these vertical pieces is placed a horizontal piece $e$ of the same size as the bottom, having an oblong aperture $f$ in the center, through which the water is admitted to the wheels. In the center of this case, and through the circular apertures before mentioned, is placed a horizontal shaft B, turning on gudgeons in apertures in the end pieces of the case. One of the gudgeons projects beyond the end of the case, and is formed into a crank G, to which the end of a saw-mill pitman-rod or any other fixture desired may be attached. On this shaft are placed two cast-iron wheels D D, Figs. 1, 2, 4, 5, and 7, each the section of a cone, one placed in each of the circular apertures of the two center upright pieces of the case, with the smaller part of each wheel placed toward the center of the case. Each of these wheels is cast with two concentric conical or bevel rings $g\ g$, with oblique-curved or spirally-shaped buckets $h\ h$ between them. On the shaft is made a channel $i$, Fig. 2, to receive a conical hub upon which the center ring or eye of the wheel is fitted and secured. When the wheel is to be run in a vertical position, the rims of the wheel should not be so beveling as when run in a horizontal position, as the water venting downward leaves the wheel more easy and natural. The object of beveling or sloping inwardly the outer rim of the wheel is to increase the power by causing the gravity of the water to act on a greater inclined surface than in wheels with vertical sides and inclined buckets only, the water acting the same on the outside rim as it does on the bucket. Around the circumference of the smaller end of the outer rim is a flange $k$ to lie flat against the disk, Figs. 2, 4, and 7. Any required number of these wheels may be arranged in pairs on the shaft, according to the head of water.

The water is introduced between the two wheels here described through the oblong aperture in the top of the case in the manner of some reacting water-wheels in use, and escapes through the throats of the wheels to the right and left and acts upon the inclined surface of the buckets and outer rim on the principle of the reaction mill, propelling the wheel in a contrary direction to that in which it escapes.

The invention claimed by me, the said NELSON JOHNSON, and which I desire to secure by Letters Patent, consists—

In making the outer and inner rims of reaction water-wheels, between which the inclined spiral buckets are placed, in the shape of a section of a cone.

NELSON JOHNSON.

Witnesses:
  JOHN C. PEARLEE,
  MORRIS JOHNSON.